June 1, 1926.

O. T. LEE ET AL

ANIMAL TRAP

Filed April 7, 1925

1,586,630

INVENTORS
OLAVUS T. LEE.
HENRY A. SMITH

BY

ATTYS.

Patented June 1, 1926.

1,586,630

UNITED STATES PATENT OFFICE.

OLAVUS THOMAS LEE AND HENRY ANDREW SMITH, OF STETTLER, ALBERTA, CANADA.

ANIMAL TRAP.

Application filed April 7, 1925. Serial No. 21,345.

This invention relates to improvements in animal traps and particularly to that class of traps adapted to catch rats and mice and the objects of the invention are to provide a simply constructed and efficient device of this character into which a rat or a mouse can readily enter but from which he cannot possibly get out.

Further objects are the provision of a strongly constructed device of this description that can be manufactured at a low price and placed on the market accordingly.

With the foregoing and other objects in view, the invention consists essentially in the device, an example of which is described in the present specification and illustrated by the accompanying drawings that form part of the same.

Figure 1:
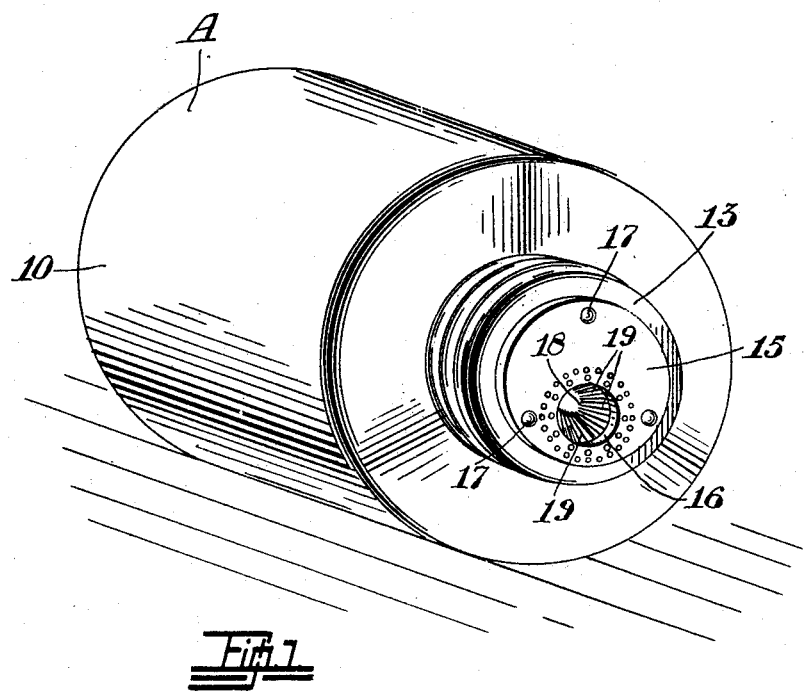
Figure 2:
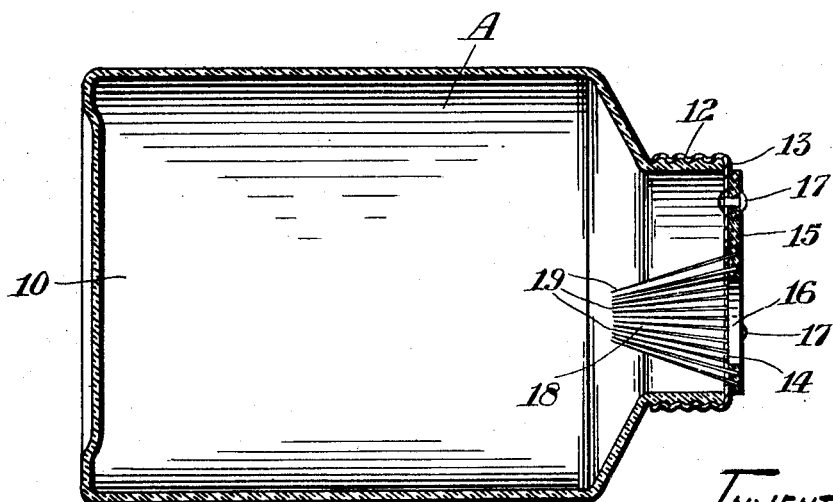

Referring now to the drawings, in which like characters of reference indicate corresponding parts in each figure, Figure 1 is a perspective view of the trap, and Figure 2 is a longitudinal section.

Referring more particularly to the drawings, in which an example of my trap is illustrated, A indicates the device as a whole comprising a container 10, of any suitable material and of any suitable form, here shown substantially jar shaped with an open top screw threaded on the outside at 12 to engage with a metal cap or cover 13 in which is an opening 14. Over the opening 14, on the outside of the cap, is attached a pad member 15 having an opening therein 16 registering with the opening in the cover. This pad is preferably of penetrable material such as rubber or the like and is adapted to be secured in any suitable manner onto the cover 13, such as in the example here shown by means of rivets or the like 17.

Around the opening 16 in the pad 15 are stuck a plurality of pins with the pointed ends extending inwardly and converging to form a funnel shaped entrance 18 to the container 10. While here shown with the pad 15 attached to the cover to carry the pins, it will be understood that the cap itself, being adapted to be made of any suitable material, can be adapted to receive the pointed prongs or pin members 19 around the opening 14 direct and thus dispense with the use of the pad.

In operation, bait having been placed in the body of the container, the mouse or rat, being attracted, will enter through the hole 16 without any difficulty but on attempting to get out again will be met by the pointed ends of the prongs or pins 19 making it impossible for the animal to leave.

As many changes could be made in the above construction and many apparently widely different embodiments of our invention, within the scope of the claim, constructed without departing from the spirit or scope thereof, it is intended that all matter contained in the accompanying specification and drawings shall be interpreted in an illustrative and not in a limiting sense.

What we claim as our invention is:

An animal trap having an opening therein to form an entrance, a pad of flexible material formed with an opening similar to the entrance opening and designed to be detachably secured on the trap around the entrance, a plurality of prongs or pins pointed at one end and flanged at the other end arranged in the flexible material around the opening and designed to converge and extend downwardly from the pad through the trap entrance to form a passageway therefrom, and means for attaching the pad to the trap.

In witness whereof we have hereunto set our hands.

OLAVUS THOMAS LEE.
HENRY ANDREW SMITH.